(12) United States Patent
Zhang et al.

(10) Patent No.: US 10,789,888 B2
(45) Date of Patent: Sep. 29, 2020

(54) PROXIMITY-DETECTION METHOD FOR ELECTRONIC DEVICE

(71) Applicant: GUANGDONG OPPO MOBILE TELECOMMUNICATIONS CORP., LTD., Dongguan, Guangdong (CN)

(72) Inventors: Haiping Zhang, Guangdong (CN); Lei Liu, Guangdong (CN); Le Yang, Guangdong (CN)

(73) Assignee: Guangdong OPPO Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

(21) Appl. No.: 16/202,391

(22) Filed: Nov. 28, 2018

(65) Prior Publication Data

US 2019/0287463 A1 Sep. 19, 2019

(30) Foreign Application Priority Data

Mar. 16, 2018 (CN) .......................... 2018 1 0219477

(51) Int. Cl.
*G09G 3/3258* (2016.01)
*G06F 3/042* (2006.01)
(Continued)

(52) U.S. Cl.
CPC .......... *G09G 3/3258* (2013.01); *G01S 7/4813* (2013.01); *G01S 17/04* (2020.01);
(Continued)

(58) Field of Classification Search
CPC .......... G09G 3/3258; G09G 2320/064; G09G 2320/0276; G09G 2310/08;
(Continued)

(56) References Cited

U.S. PATENT DOCUMENTS

| | | | |
|---|---|---|---|
| 6,777,886 B1 * | 8/2004 | Lo ........................ | G09G 3/3258 315/169.1 |
| 2010/0321339 A1 * | 12/2010 | Kimmel ................ | G06F 3/0412 345/175 |

(Continued)

FOREIGN PATENT DOCUMENTS

| | | |
|---|---|---|
| CN | 102917091 A | 2/2013 |
| CN | 103106863 A | 5/2013 |

(Continued)

OTHER PUBLICATIONS

International search report,PCT/CN2018/121563, dated Mar. 18, 2019 (11 pages).

(Continued)

*Primary Examiner* — Brent D Castiaux

(57) ABSTRACT

A proximity-detection method, a non-transitory computer readable medium and an electronic device are disclosed. The proximity-detection method is applied to the electronic device. The electronic device may include a display screen and an infrared-light proximity sensor covered by the display screen and configured to detect whether an object is proximity to the electronic device, the display screen has a capability of allowing infrared lights to pass through. The proximity-detection method may include setting an operation timing of the display screen as a target timing when the infrared-light proximity sensor is enabled, wherein the target timing comprises a target duration and the display screen is controlled to emit no lights during the target timing; controlling the infrared-light proximity sensor to emit the infrared lights during the target duration; and performing proximity detection based on the infrared lights.

10 Claims, 9 Drawing Sheets

(51) Int. Cl.
  *G01S 17/04* (2020.01)
  *G01V 8/12* (2006.01)
  *G01S 7/481* (2006.01)
(52) U.S. Cl.
  CPC ............... *G01V 8/12* (2013.01); *G06F 3/042* (2013.01); *G06F 3/0421* (2013.01); *G09G 2310/02* (2013.01); *G09G 2310/08* (2013.01); *G09G 2320/0276* (2013.01); *G09G 2320/064* (2013.01)
(58) Field of Classification Search
  CPC ... G09G 2310/02; G06F 3/0421; G06F 3/042; G01S 7/4813; G01S 17/026; G01V 8/12; G01V 8/10
  See application file for complete search history.

(56) References Cited

U.S. PATENT DOCUMENTS

| | | | | |
|---|---|---|---|---|
| 2011/0267269 A1* | 11/2011 | Tardif | ................. | H04N 21/422 345/158 |
| 2013/0002736 A1 | 1/2013 | Park | | |
| 2014/0024356 A1 | 1/2014 | Yoon et al. | | |
| 2014/0232540 A1 | 8/2014 | Shanker | | |
| 2016/0027364 A1* | 1/2016 | Park | ........................ | G09G 3/20 345/690 |
| 2019/0006438 A1 | 1/2019 | Wu et al. | | |

FOREIGN PATENT DOCUMENTS

| | | |
|---|---|---|
| CN | 106598358 A | 4/2017 |
| CN | 106851012 A | 6/2017 |
| CN | 106940633 A | 7/2017 |
| CN | 107316885 A | 11/2017 |
| CN | 107767835 A | 3/2018 |
| WO | WO2014035557 A1 | 3/2014 |

OTHER PUBLICATIONS

European search report, EP18212892, dated Aug. 12, 2019 (6 pages).

First Office from China patent office in a counterpart Chinese patent Application 201810219477.7, dated Mar. 30, 2020 (20 pages).

* cited by examiner

Setting an operation timing of the display screen as a target timing when the infrared-light proximity sensor is enabled, wherein the target timing comprises a target duration and the display screen is controlled to emit no lights during the target timing — S101

Controlling the infrared-light proximity sensor to emit the infrared lights during the target duration — S102

Performing proximity detection based on the infrared lights — S103

FIG. 7

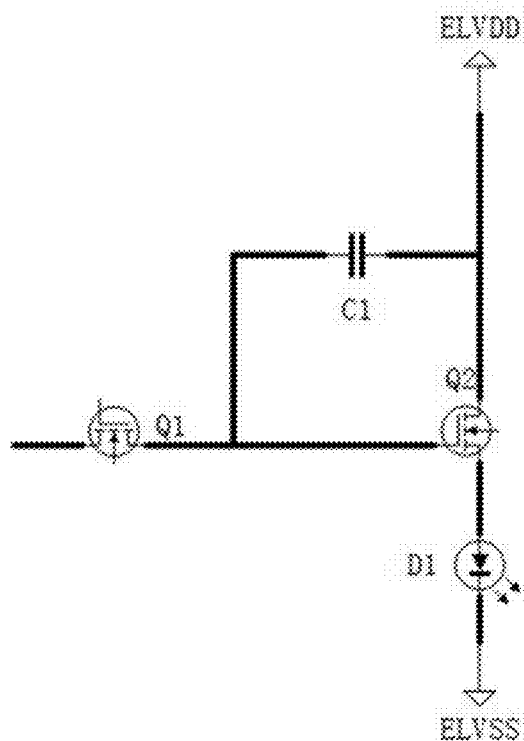

FIG. 8

XX news

XXXXXXXXXX

XXXXXXXXXX

XXXXXXXXXX

FIG. 12

+86 159 XXXX XXXX calling

FIG. 13

PROXIMITY-DETECTION METHOD FOR ELECTRONIC DEVICE

CROSS-REFERENCE TO RELATED APPLICATIONS

This application claims a priority to Chinese Patent Application No. 201810219477.7, filed on Mar. 16, 2018, the contents of which are herein incorporated by reference in its entirety.

TECHNICAL FIELD

The present disclosure generally relates to the technical field of optoelectronic technology, and in particular relates to a proximity-detection method for an electronic device.

BACKGROUND

A proximity sensor, such as an infrared-light proximity sensor, is typically installed on an electronic device such as a smartphone and a tablet. The electronic device performs proximity detection through the infrared-light proximity sensor. The infrared-light proximity sensor includes a transmitting end and a receiving end. The transmitting end can emit infrared lights for detecting-signal to outside. The infrared lights for detecting-signal are reflected after encountering an external obstacle object, and the reflected infrared lights for detecting-signal are received by the receiving end. The received reflected infrared lights for detecting-signal can be converted into a current, a magnitude of which has a relationship with a distance between the external obstacle object and the electronic device. Thus, the electronic device can determine whether the external obstacle object approaches to or moves away from the electronic device according to the magnitude of the current.

However, it is difficult to perform proximity detection on an electronic device with a full display screen.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

FIG. 7 is a flowchart illustrating a proximity-detection method according to an embodiment of the present disclosure.

FIG. 8 is a circuit diagram of a pixel of an AMOLED display screen according to an embodiment of the present disclosure.

FIGS. 12-14 are schematic diagrams showing scenes for a proximity-detection method according to an embodiment of the present disclosure.

DETAILED DESCRIPTION

Figure 1:
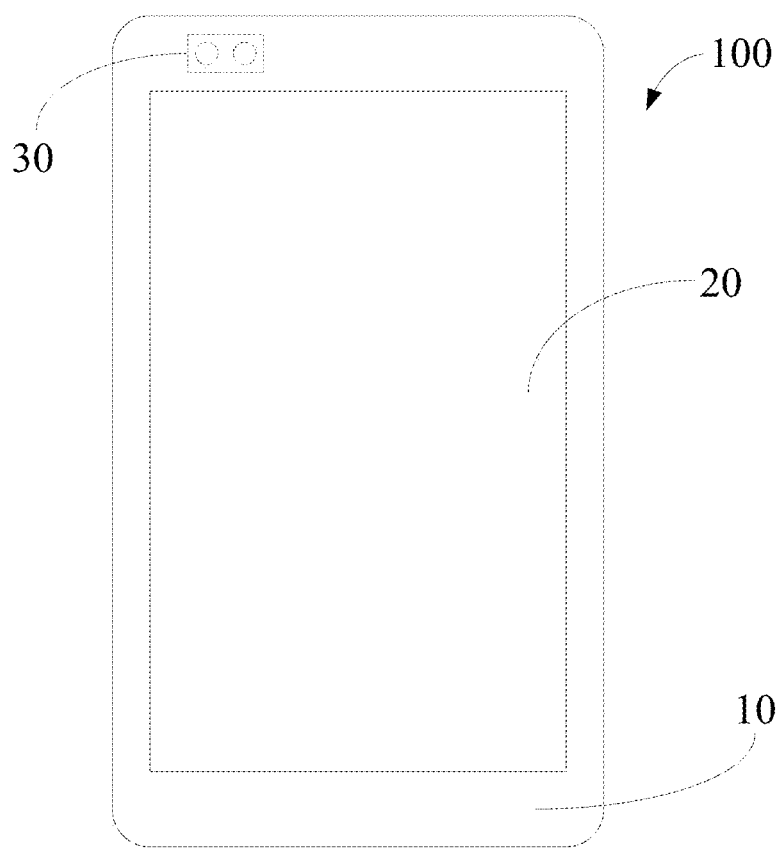
FIG. 1 is a schematic view of an electronic device in which an infrared-light proximity sensor is disposed in the related art.

Referring to the drawings, like reference numerals represent the same components, the principle of the present disclosure is illustrated as the present disclosure is implemented in the context of a suitable computing environment. The following description is illustrated based on some embodiments of the present disclosure, which are not intended to limit the present disclosure.

Figure 2:
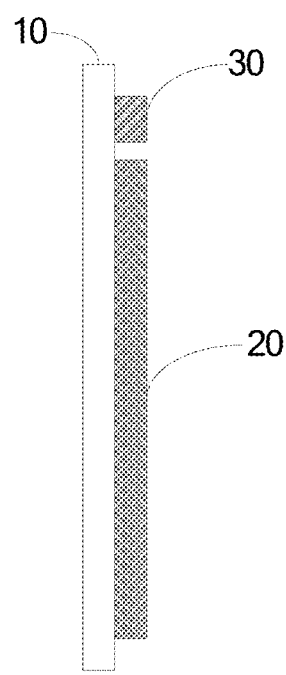
FIG. 2 is a cross-sectional view of the electronic device in FIG. 1.

Referring to FIGS. 1 and 2, in the related art, a cover plate 10 of an electronic device 100 is attached to a display screen 20, and an infrared-light proximity sensor 30 is covered by the cover plate 10. No ink is coated on a part of the cover plate 10 which corresponds to the infrared-light proximity sensor 30. When the infrared-light proximity sensor 30 operates, its infrared-light emitting component emits infrared lights for detecting-signal (which has a wavelength above 770 nm), and the infrared lights for detecting-signal passes through the transparent part of the cover plate 10 where no ink is coated. When the infrared lights for detecting-signal encounters an obstacle object (such as a user's skin, etc.), it is reflected. The reflected infrared lights for detecting-signal passes through the transparent part of the cover plate 10 where no ink is coated, is received by an infrared-light receiving component, and is converted into a current (photoelectric effect). There is a corresponding relationship between the magnitude of the current and a distance of the obstacle object from the electronic device 100. The electronic device 100 can determine that the obstacle object approaches to the electronic device 100 or is away from the electronic device 100 according to the magnitude of the current.

For example, in a scene where a user is calling with the electronic device 100, the infrared-light proximity sensor 30 is in an operation state. The electronic device 100 converts the infrared light received by the infrared-light receiving component into a current which corresponds to a value. The electronic device 100 can then compare the value to a preset threshold. If the value is less than the preset threshold, the electronic device 100 can determine that the obstacle object (such as the user's facial skin) is away from the electronic device 100 (that is, the obstacle object is far away from the electronic device), and then the display screen 20 of the electronic device 100 can be turned on to emit lights. If the value is greater than or equal to the preset threshold, the electronic device 100 can determine that the obstacle object approaches the electronic device 100 (that is, the obstacle object is closer to the electronic device 100), and then the display screen 20 of the electronic device 100 can be turned off to emit no lights, preventing false triggering operations on the display screen 20.

However, in the related art, as shown in FIGS. 1 and 2, the infrared-light proximity sensor 30 needs to occupy a certain space on a back surface of the cover plate 10. Therefore, it is disadvantageous to achieve a full display screen.

Figure 3:
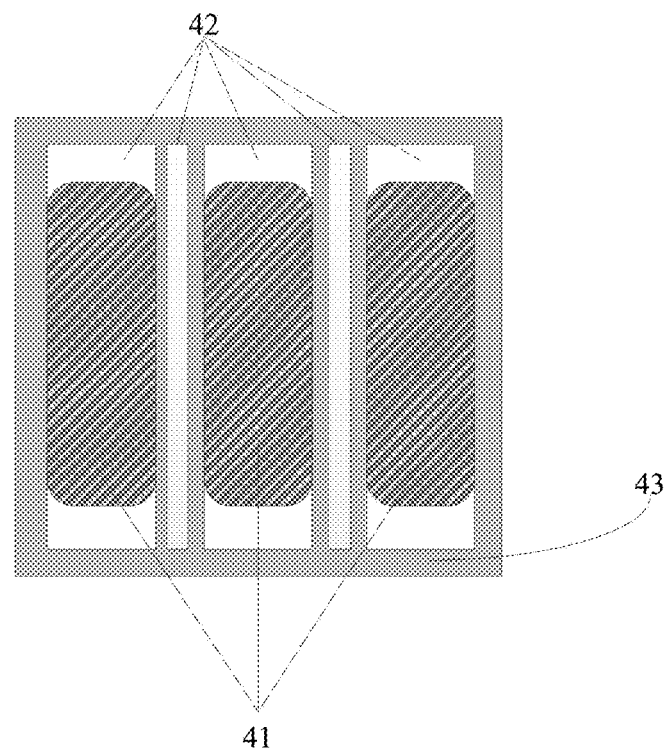
FIG. 3 is a schematic view of a pixel area of an AMOLED (Active-matrix Organic Light Emitting Diode) display screen according to an embodiment of the present disclosure.
Figure 4:
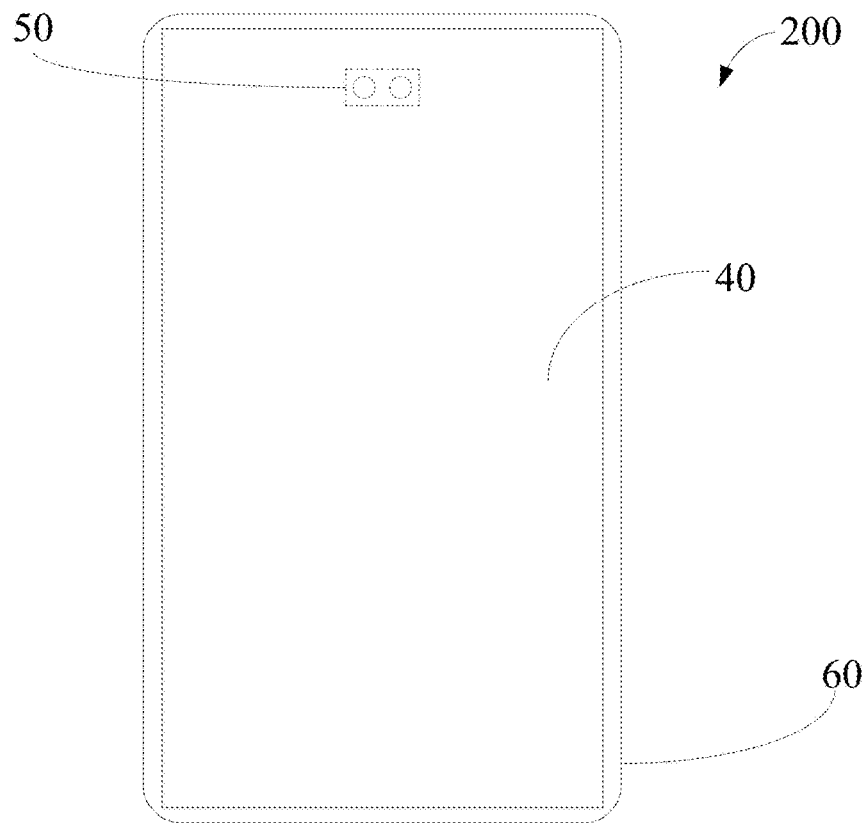
FIG. 4 is a schematic view of an electronic device in which an infrared-light proximity sensor is disposed according to an embodiment of the present disclosure.
Figure 5:
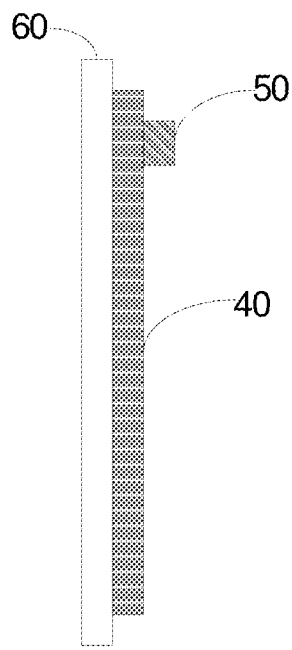
FIG. 5 is a cross-sectional view of the electronic device in FIG. 4.

Referring to FIGS. 3 to 5, an electronic device 200 is provided in an embodiment of the present disclosure. The electronic device 200 may include a display screen 40 and an infrared-light proximity sensor 50. The display screen 40 has a capability of allowing infrared lights to pass through. In one example, the display screen 40 may be an AMOLED (Active-matrix Organic Light Emitting Diode) display screen. Alternatively, the display screen 40 may be an AMQLED (Active Quantum Dot Light Emitting Diode) display screen or the like.

Referring to FIG. 3, FIG. 3 is a schematic view of a pixel area of an AMOLED display screen. The pixel area of the AMOLED display screen includes a light-emitting area 41, a transparent area 42, and an opaque area 43. The light-emitting area 41 includes a red-light emitting pixel, a green-light emitting pixel, and a blue-light emitting pixel. The material of the transparent area 42 may be Indium Tin Oxide (ITO) or PVX (SiNx). The opaque area 43 includes metal lines and thin film transistors (TFT). The TFTs may be a metal oxide semiconductor field effect transistors (MOSFETs). The material of the transparent area 42 (such as ITO or PVX) allows infrared lights to pass through. Therefore, the infrared-light proximity sensor 50 may be covered by the AMOLED display screen.

Referring to FIGS. 4 and 5, in the electronic device 200 in this embodiment of the present disclosure, the infrared-light proximity sensor 50 is located on a back surface of the display screen 40, the infrared-light proximity sensor 50 is covered by the display screen 40, and the display screen 40 is attached to a cover plate 60.

Figure 6:
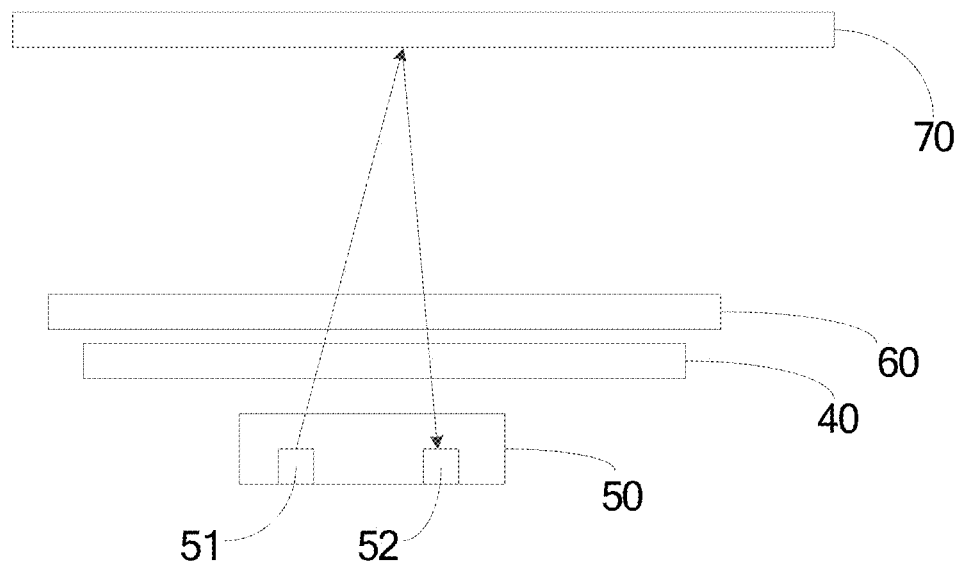
FIG. 6 is a schematic diagram of a scene where the infrared-light proximity sensor in FIG. 4 operates according to an embodiment of the present disclosure.

Referring to FIG. 6, the infrared-light proximity sensor 50 includes an infrared-light emitting component 51 and an infrared-light receiving component 52. The infrared-light emitting component 51 emits infrared lights to the outside, which sequentially passes through the display screen 40 and the cover plate 60. The infrared lights for detecting-signal is reflected after encountering an obstacle object 70. The reflected the infrared lights sequentially passes through the cover plate 60 and the display screen 40, is then received by the infrared-light receiving component 52, and is converted into a current (photoelectric effect). There is a corresponding relationship between a magnitude of the current and a distance of the obstacle object 70 from the electronic device 200. The electronic device 200 can then determine that the obstacle object approaches to the electronic device or is away from the electronic device 200 according to the magnitude of the current.

It should be understood that, in the electronic device 200 in this embodiment of the present disclosure, the infrared-light proximity sensor 50 can be disposed on the back surface of the display screen 40. As the infrared-light proximity sensor 50 is covered by the display screen 40, the infrared-light proximity sensor 50 does not occupy a space on the cover plate 60. Therefore, in this embodiment of the present disclosure, the display screen 40 is full in the electronic device 200.

Referring to FIG. 7, FIG. 7 is a flowchart illustrating a proximity-detection method according to an embodiment of the present disclosure. The proximity-detection method can be applied to an electronic device, for example, the electronic device 200. The electronic device can include a display screen and an infrared-light proximity sensor. The display screen has a capability of allowing infrared lights to pass through. The infrared-light proximity sensor is covered by the display screen. The proximity-detection method may include actions in the following blocks.

At block S101, the operation timing of the display screen is set as a target timing when the infrared-light proximity sensor is enabled. The target timing includes a target duration and the display screen is controlled to emit no lights during the target timing.

In the case where the infrared-light proximity sensor is covered by the display screen, if the display screen and the infrared-light proximity sensor operate simultaneously, TFTs in a pixel circuit of the display screen is affected by the infrared lights. Thus, an area on the display screen becomes brighter, which corresponds to an area where the infrared-light emitting component is disposed.

In one example where the display screen is an AMOLED display screen, referring to FIG. 8, a schematic diagram of a pixel circuit of the AMOLED display screen is illustrated. Q1 and Q2 may be MOSFETs, C1 is a capacitor, D1 is an organic light emitting diode, ELVDD is a positive voltage for the pixel circuit, and ELVSS is a negative voltage for the pixel circuit. ELVDD is connected to a source electrode of Q2, and ELVSS is connected to a cathode of D1.

When Q1 is turned on, the capacitor C1 is charged, and when Q1 is turned off, the charged voltage of C1 remains. When a voltage difference occurs between a gate electrode and the source electrode of Q2, a corresponding current is generated in a path formed by ELVDD, Q2, D1, and ELVSS, and then D1 emits lights. By using a corresponding relationship between a source-drain current and a gate-source voltage of Q2, the corresponding current which flow through Q2 is controlled by the charged voltage of C1, and D1 is controlled to emit the lights with different intensities.

Figure 9:
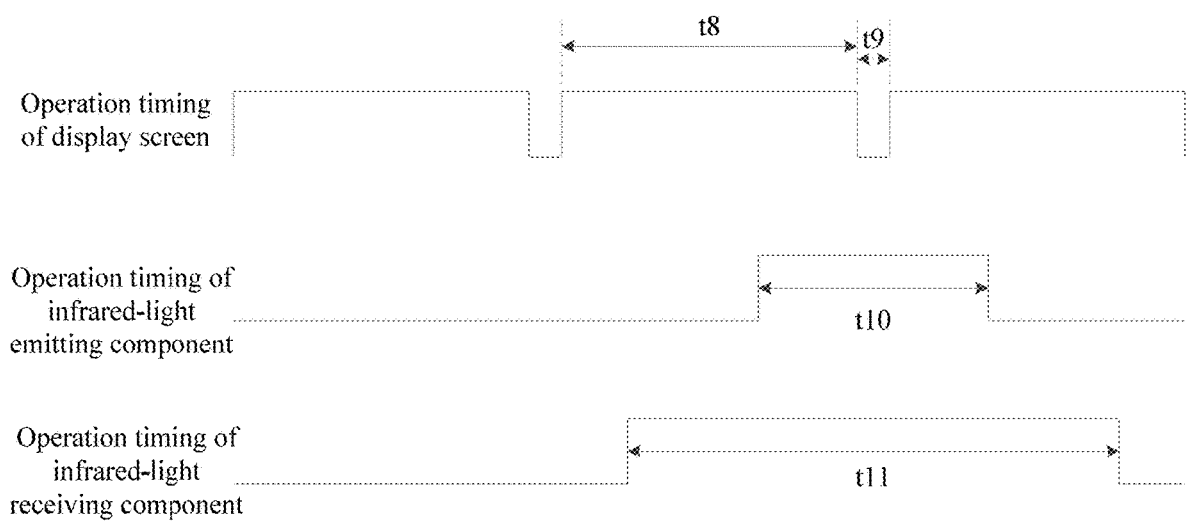
FIG. 9 is a schematic diagram showing an operation timing of an AMOLED display screen, an operation timing of the infrared-light emitting component, and an operation timing of the infrared-light receiving component in the related art.

Referring to FIG. 9, FIG. 9 is a schematic diagram showing an operation timing of the AMOLED display screen, an operation timing of the infrared-light emitting component, and an operation timing of the infrared-light receiving component in the related art. During one cycle, the operating timing of the AMOLED display screen includes a duration t8 and a duration t9. The duration t8 is a duration configured for scan-refreshing of the AMOLED display screen, and the duration t9 is a duration configured for a drive chip to process data of a next frame and prepare for displaying. In the related art, the operation timing of the infrared-light emitting component in one cycle includes an emitting duration t10 and a non-emitting duration, and the operation timing of the infrared-light receiving component includes a receiving duration t11 and a non-receiving duration. As it can be seen from FIG. 9, if the operation timing of the AMOLED display screen and the operation timing of the infrared-light proximity sensor shown in FIG. 9 are adopted in the related art, the AMOLED display screen may be exposed by the infrared lights emitted by the infrared-light emitting component, because the emitting duration t10 is overlapped with the durations t8 and t9.

When the display screen is exposed by the infrared lights, the exposed infrared lights may cause leakage currents in Q1 and Q2 since Q1 and Q2 are MOSFETs which are light sensitive. Thus, D1 becomes brighter, which in turn causes brightness of an area exposed by the infrared lights be greater than brightness of an area unexposed by the infrared lights when the AMOLED display screen operates. For example, a region A on the AMOLED display screen faces to the infrared-light proximity sensor. When the AMOLED display screen and the infrared-light proximity sensor operates simultaneously, brightness at the region A on the AMOLED display screen is greater than that at other regions on the AMOLED display screen.

As described above, in the block S101 of the embodiment of the present disclosure, the operation timing of the display screen may be set as the target timing when the infrared-light proximity sensor is enabled. The target timing includes the target duration and the display screen is controlled to emit no lights during the target timing.

At block S102, the infrared-light proximity sensor is controlled to emit the infrared lights during the target duration.

In one example, the infrared-light proximity sensor may be controlled to operate to emit the infrared lights to the outside during the target duration, after the operation timing of the display screen has been set as the target timing.

At block S103, proximity detection is performed based on the infrared lights.

In one example, the electronic device can perform the proximity detection based on the infrared lights, after the infrared-light proximity sensor of the electronic device emits the infrared lights.

It should be noted that, in this embodiment of the present disclosure, the display screen does not emit lights during the target duration of the target timing. That is, light-emitting components (such as a MOSFET) in the pixel circuit of the display screen does not emit lights. However, the infrared-light proximity sensor emits the infrared lights to the outside during the target duration. In this case, although the light-emitting components, which are light-sensitive, are exposed to the infrared lights such that the leakage current of the light-emitting components is increased, there will occur no problems about the brightness of the exposed area being greater than the brightness of the unexposed area on the display screen. Because the light-emitting components are controlled to emit no lights. Therefore, in this embodiment, the proximity-detection method is helpful to the electronic device with the full display screen.

Figure 10:
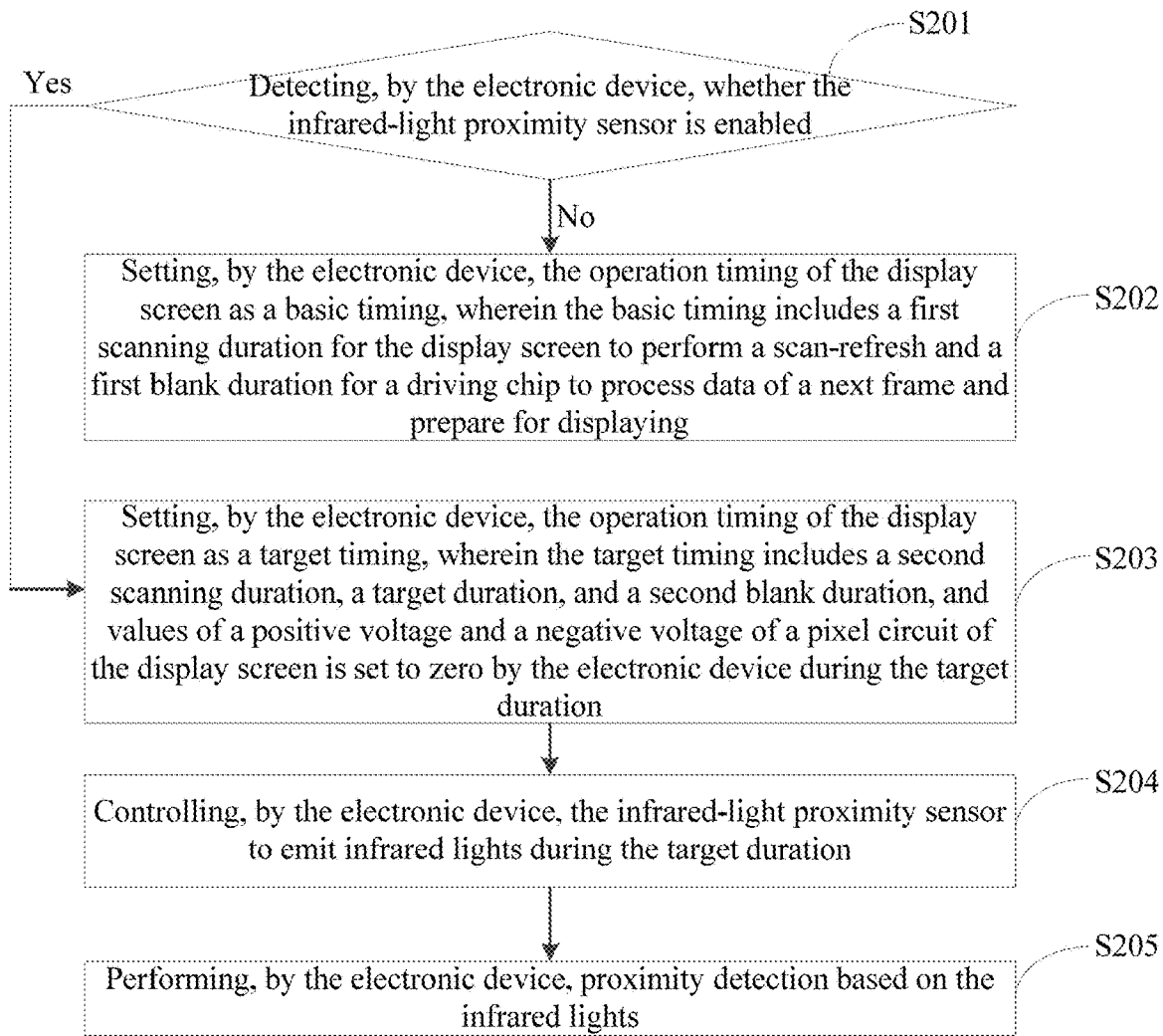
FIG. 10 is a flowchart illustrating a proximity-detection method according to another embodiment of the present disclosure.

Referring to FIG. 10, FIG. 10 is a flowchart illustrating a proximity-detection method according to another embodiment of the present disclosure. The proximity-detection method can be applied to an electronic device, for example, the electronic device in FIG. 3. The electronic device can include a display screen and an infrared-light proximity sensor. The display screen has a capability of allowing infrared lights to pass through. For example, the display screen is an AMOLED display screen. The infrared-light proximity sensor is covered by the display screen. The proximity-detection method may include actions in the following blocks.

At block S201, whether the infrared-light proximity sensor is enabled may be detected by the electronic device.

In one example, the electronic device can first detect whether its infrared-light proximity sensor is enabled.

If it is detected that the infrared-light proximity sensor is enabled, block S202 is then performed. If it is detected that the infrared-light proximity sensor is disabled, block S203 is then performed.

At the block S202, the operation timing of the display screen may be set as a basic timing by the electronic device when the infrared-light proximity sensor is disabled, wherein the basic timing includes a first scanning duration and a first blank duration. The first scanning duration is a duration configured for the display screen to perform a scan-refresh, and the first blank duration is a duration configured for a driving chip to process of data a next frame and prepare for displaying.

In one example, if the electronic device detects that its infrared-light proximity sensor is disabled, the electronic device can set the operation timing of its AMOLED display screen as the basic timing. The basic timing includes the first scanning duration and the first blank duration. The first scanning duration is a duration configured for the AMOLED display screen to perform a scan-refresh, and the first blank duration is a duration configured for a driving chip to process data of a next frame and prepare for displaying.

At the block S203, the operation timing of the display screen is set as a target timing by the electronic device when the infrared-light proximity sensor is enabled, wherein the target timing includes a second scanning duration, a target duration, and a second blank duration. During the target duration, values of a positive voltage and a negative voltage of a pixel circuit of the display screen may be set to zero, for example, by the electronic device. Thus, the display screen is controlled to emit no lights.

In one example, if the electronic device detects that the infrared-light proximity sensor is enabled to prepare to operate, the electronic device can set the operation timing of its AMOLED display screen as the target timing. The target timing includes the second scanning duration, the target duration, and the second blank duration. The second scanning duration is a duration configured for the AMOLED display screen to perform a scan-refresh, and the second blank duration is a duration configured for a driving chip to process data of a next frame and prepare for displaying. During the target duration, values of a positive voltage and a negative voltage of a pixel circuit of the AMOLED display screen may be set to zero by the electronic device. Thus, the AMOLED display screen is controlled to emit no lights.

Figure 11:
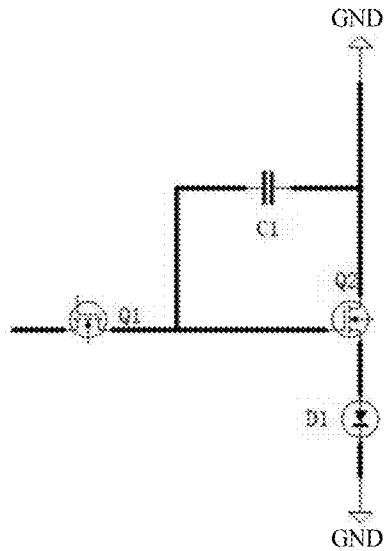
FIG. 11 is a circuit diagram illustrating a pixel circuit of an AMOLED display screen according to another embodiment of the present disclosure.

Referring to FIG. 11, D1 in the pixel circuit of the AMOLED display screen emits no lights when both the positive voltage and the negative voltage are 0 (i.e., GND in FIG. 11).

The AMOLED display screen emits lights during the second scanning duration. The AMOLED display may emit lights, or may emit no lights in the second blank duration.

In one embodiment, the target duration is located between the second scan duration and the second blank duration.

At block S204, the infrared-light proximity sensor is controlled by the electronic device to emit infrared lights during the target duration.

At block S205, proximity detection is performed by the electronic device based on the infrared lights.

In one example, the above blocks S204 and S205 may include the following. After the operation timing of the AMOLED display screen is set as the target timing, the electronic device can control the infrared-light proximity sensor to emit the infrared lights during the target duration, and the electronic device can then perform the proximity detection based on the infrared lights.

Figure 14:
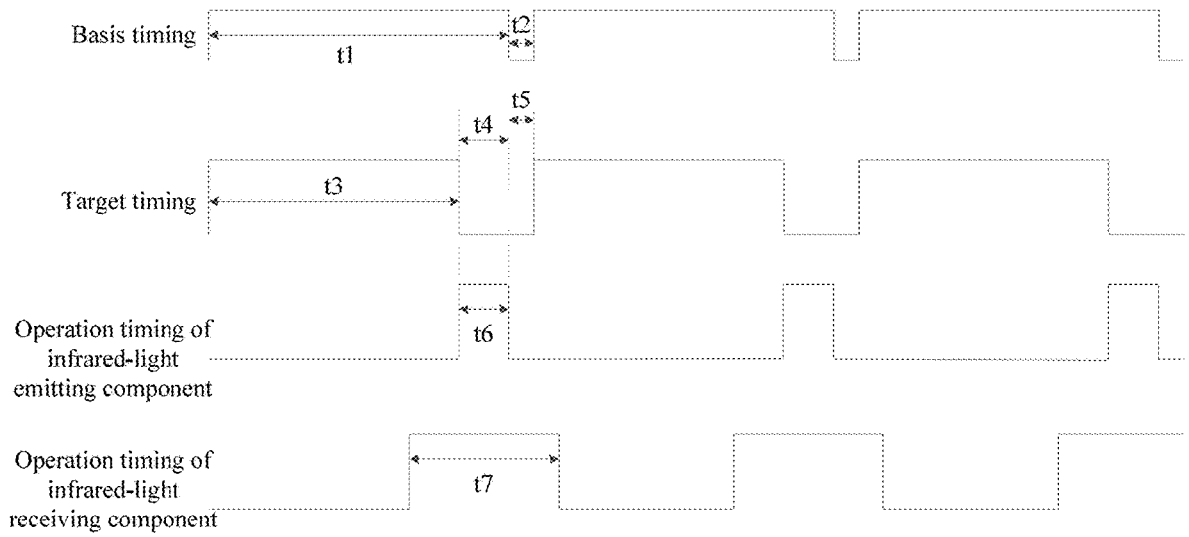

Referring to FIGS. 12 to 14, FIGS. 12 to 14 are schematic diagrams showing scenes for a proximity-detection method according to an embodiment of the present disclosure.

In a scene, as shown in FIG. 12, a user is browsing news using the electronic device, and an interface for the news on the electronic device is illustrated. When the user browses the news using the electronic device, that is, the infrared-light proximity sensor is disabled, the operation timing of the AMOLED display screen of the electronic device can set as the basic timing. The basic timing includes the first scanning duration and the first blank duration. The first scanning duration is a duration configured for the AMOLED display screen to perform a scan-refresh, and the first blank duration is a duration configured for a driving chip to process data of a next frame and prepare for displaying. A timing diagram of the basic timing may be shown in FIG. 14. The basis timing is a periodic, and the first scanning period and the first blank period are constituted one period of the basis timing.

After a period of time, in another scene, as shown in FIG. 13, the electronic device receives a call, and an interface for the call on the electronic device interface is illustrated. When the user answers the call, the electronic device can control its infrared-light proximity sensor to be enabled to prepare to operate. At this time, the electronic device may switch the operation timing of its AMOLED display screen from the above basic timing to the target timing.

The target timing includes a second scanning duration, a target duration, and a second blank duration. The target timing is periodic, and the second scanning period, the target period, and the second blank period are constituted one period of the target timing. The second scanning duration is a duration configured for the AMOLED display screen to perform a scan-refresh, and the second blank duration is a duration configured for a driving chip to process data of a next frame and prepare for displaying.

In an embodiment, during the second scanning duration, a value of the positive voltage of the pixel circuit of the AMOLED display screen may be a set value, for example, value C. During the second scanning duration, a value of the negative voltage of the pixel circuit of the AMOLED display screen may also be a set value, for example, value D. During the second scanning duration, the potential difference between the positive voltage and the negative voltage (i.e., C-D) is greater than a target threshold. The target threshold is configured to cause the organic light-emitting diode in the pixel circuit emitting lights.

During the target duration, the electronic device can set both values of the positive voltage and the negative voltage of the pixel circuit of the AMOLED display screen to zero, so that the AMOLED display screen emits no lights.

Of course, in other embodiments, during the target duration, the values of the positive voltage and the negative voltage of the pixel circuit of the AMOLED display screen may not necessarily be set to zero. The electronic device may only need to control the potential difference between the positive voltage and the negative voltage of the pixel circuit of the AMOLED display screen be less than the target threshold, so that the AMOLED display screen does not emit lights during the target duration. The target threshold is a potential difference between the positive voltage and the negative voltage that allows the light-emitting components in the pixel circuit to emit lights. That is, when the potential difference between the positive voltage and the negative voltage is equal to or greater than the target threshold, the light-emitting components in the pixel circuit will emit lights. When the potential difference between the positive voltage and the negative voltage is less than the target threshold, the light-emitting components in the pixel circuit will emit no lights.

In one example, a period of the target timing may be equal to a period of the basic timing, which may be controlled by the electronic device. That is, the sum of the second scanning duration, the target duration, and the second blank duration is equal to the sum of the first scanning duration and the first blank duration.

In an embodiment, the second blank duration may be equal to the first blank duration. The second scanning duration is less than the first scanning duration as the sum of the second scanning duration, the target duration, and the second blank duration is equal to the sum of the first scanning duration and the first blank duration. In this case, the electronic device may increase luminous intensity of the AMOLED display screen during the second scanning duration. That is, if the second scanning duration is less than the first scanning duration, the electronic device may increase the luminous intensity of the AMOLED display screen in the second scanning duration, after the operation timing of the AMOLED display screen is switched from the basic timing to the target timing.

It should be noted that, during the target timing, the AMOLED display screen emits light within the second scanning duration, and the AMOLED display screen may not emit lights within the target duration and the second blank duration. If a frame rate remains a constant or the second blank duration is equal to the first blank duration, time as the AMOLED display screen emits lights becomes shorter in the target timing (because a display time per frame is shortened) compared with that in the basic timing. Since the human eyes feels brightness with a time domain convolution integral effect, the brightness is reduced for the human eyes at this time. In this case, the brightness perceived by the human eyes may be ensured to be same by increasing the luminous intensity of the AMOLED display screen during the second scanning duration, when the operation timing of the AMOLED display screen is switched from the basic timing to the target timing.

In some embodiments, the luminous intensity of the AMOLED display screen is increased by a Gamma Correction process during the second scanning duration. Alternatively, the luminous intensity of the display screen may be increased by increasing a potential difference between the positive voltage (i.e., ELVDD) and the negative voltage (i.e., ELVSS) of the pixel circuit of the AMOLED display screen.

Of course, in other embodiments, the second scanning duration in the target timing may be equal to the first scanning duration in the basic timing, which is controlled by the electronic device, after the operation timing of the AMOLED display screen is switched from the basic timing to the target timing. In this way, the luminous intensity of the AMOLED display screen is not necessary to be increased during the second scanning duration. As is known, for the AMOLED display screen, the blank durations are fixed, that is, the first blank duration in the basic timing is equal to the second blank duration in the target timing. Thus, in the case where second scanning duration in the target timing is equal to the first scanning duration in the basic timing, the period of the target timing is larger than the period of the basic timing, because the target timing includes the target duration.

In an embodiment, the infrared-light proximity sensor includes an infrared-light emitting component and an infrared-light receiving component.

An operation timing of the infrared-light emitting component may include an emitting duration and a non-emitting duration. The emitting duration is a duration configured for the infrared-light emitting component to emit the infrared lights. In the embodiment of the present disclosure, the target duration may be overlapped with the emitting duration in time (i.e., the infrared-light emitting component emits the infrared lights during the target duration). The operation timing of the infrared-light emitting component is periodic, and the emitting duration and the non-emitting duration may be constituted one period of the operation timing of the infrared-light emitting component.

An operation timing of the infrared-light receiving component includes a receiving duration and a non-receiving duration. The receiving duration is a duration configured for the infrared-light receiving component to receive a reflected infrared lights from the infrared lights.

The period of the operation timing of the infrared-light emitting component is equal to the period of the target timing and the emitting duration is totally overlapped by the receiving duration, which may be controlled by the electronic, after the operation timing of the AMOLED display screen is switched to the target timing.

Referring to FIG. 14, t1 is the first scanning duration in the basic timing, and t2 is the first blank duration in the basic timing. t3 is the second scan duration in the target timing, t4 is the target duration in the target timing, and t5 is the second blank duration in the target timing. t6 is the emitting duration. t7 is the receiving duration.

In an embodiment of the present disclosure, t1+t2=t3+t4+t5 may be set, where t2 may be equal to t5. The emitting duration t6 is synchronized with the target duration t4 in the target timing. That is, the infrared-light emitting component of the electronic device emits the infrared lights to the outside during the target duration. Moreover, the emitting duration t6 is covered by the receiving duration t7. That is, the receiving duration t7 is greater than or equal to the emitting duration t6.

The electronic device can perform the proximity detection based on the reflected infrared lights by the obstacle object from the infrared lights, after the infrared-light emitting component emits the infrared lights to the outside during the target duration.

In the following, an electronic device in embodiments of the present disclosure will be described with reference to drawings. The electronic device includes a memory and a processor. The processor may invoke a computer program stored in the memory to perform the blocks in the proximity-detection method in the above embodiments of the present disclosure. For example, the above electronic device may be a tablet computer or a smart phone.

Figure 15:
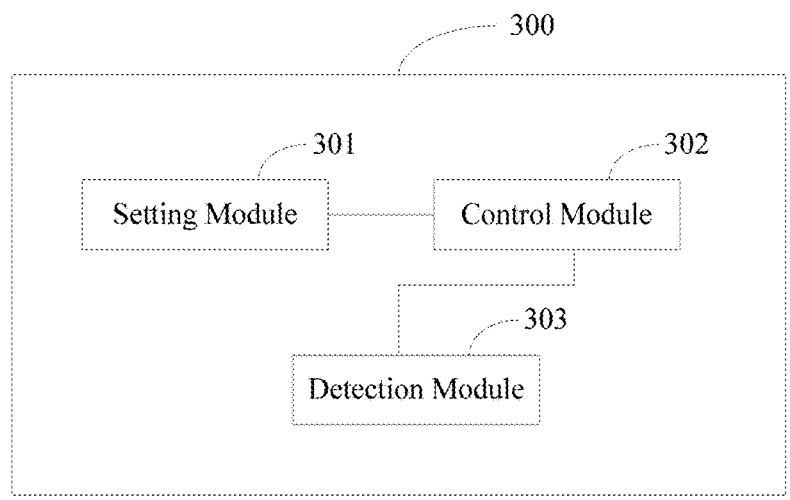
FIG. 15 is a schematic diagram of a proximity detection apparatus according to an embodiment of the present disclosure.

Referring to FIG. 15, a schematic diagram of a proximity detection apparatus according to an embodiment of the present disclosure is illustrated. The proximity-detection apparatus may be applied to an electronic device. The electronic device includes a display screen and an infrared-light proximity sensor. The display screen has a capability of allowing infrared lights to pass through, and the infrared-light proximity sensor is covered by the display screen. The apparatus includes a setting module 301, a control module 302, and a detection module 303.

The setting module 301 is configured for setting an operation timing of the display screen as a target timing when the infrared-light proximity sensor is enabled, wherein the target timing comprises a target duration, and controlling the display screen to emit no lights during the target timing.

The control module 302 is configured for controlling the infrared-light proximity sensor to emit the infrared lights during the target duration.

The detection module 303 is configured for performing proximity detection based on the infrared lights.

In some embodiments, the setting module 301 may be configured for: controlling a potential difference between a positive voltage and a negative voltage of a pixel circuit of the display screen to be less than a target threshold during the target duration such that the display screen emits no lights, wherein the target threshold is a potential difference between the positive voltage and the negative voltage which allows a light-emitting component of the pixel circuit emitting lights.

In some embodiments, the setting module 301 may be configured for setting both the positive voltage and the negative voltage of the pixel circuit of the display screen are set to zero In some embodiments, the setting module 301 may further be configured for switching the operation timing of the display screen to a basic timing when the infrared-light proximity sensor is disabled; wherein the basic timing comprises a first scanning duration and a first blank duration; the first scanning duration is a duration configured for the display screen to perform a scan-refresh; and the first blank duration is a duration configured for a driving chip to process data of a next frame and prepare for displaying.

In some embodiments, the target timing further comprises a second scanning duration and a second blank duration; the second scanning duration is a duration configured for the display screen to perform the scan-refresh; and the second blank duration is a duration configured for the driving chip to process data of the next frame and prepare for displaying.

The setting module 301 may further be configured for setting the operation timing of the display screen as the target timing, and controlling a period of the target timing to be equal to a period of the basic timing.

In some embodiments, the setting module 301 may be configured for increasing luminous intensity of the display screen during the second scanning duration when it is detected that the second scanning duration is less than the first scanning duration, after the setting the operation timing of the display screen as the target timing.

In some embodiments, the setting module 301 may be configured for increasing the luminous intensity of the display screen during the second scanning duration by a Gamma Correction process.

In some embodiments, the setting module 301 may further be configured for increasing a potential difference between a positive voltage and a negative voltage of the pixel circuit during the second scanning duration, so as to increase the luminous intensity of the display screen.

In some embodiments, the target timing further comprises a second scanning duration and a second blank duration; the second scanning duration is a duration configured for the display screen to perform the scan-refresh; and the second blank duration is a duration configured for the driving chip to process data of the next frame and prepare for displaying.

The setting module 301 may be configured for setting the operation timing of the display screen as the target timing, and controlling the second scanning duration to be equal to the first scanning duration.

In some embodiments, the target duration is located between the second scanning duration and the second blank duration during the target timing.

In some embodiments, the infrared-light proximity sensor comprises an infrared-light emitting component; an operation timing of the infrared-light emitting component comprises an emitting duration and a non-emitting duration; the emitting duration is a duration configured for the infrared-light emitting component to emit the signal for the infrared lights.

The setting module 301 may further be configured for controlling a period of the operation timing of infrared-light emitting component to be equal to a period of the target timing, after the setting the operation timing of the display screen as the target timing.

In some embodiments, the infrared-light proximity sensor further comprises an infrared-light receiving component; an operation timing of the infrared-light receiving component comprises a receiving duration and a non-receiving duration; the receiving duration is a duration configured for the infrared-light receiving component to receive a reflected signal by the object from the signal for the infrared lights.

The setting module 301 may further be configured for controlling the emitting duration to be totally overlapped by the receiving duration, after the setting the operation timing of the display screen as the target timing.

Figure 16:
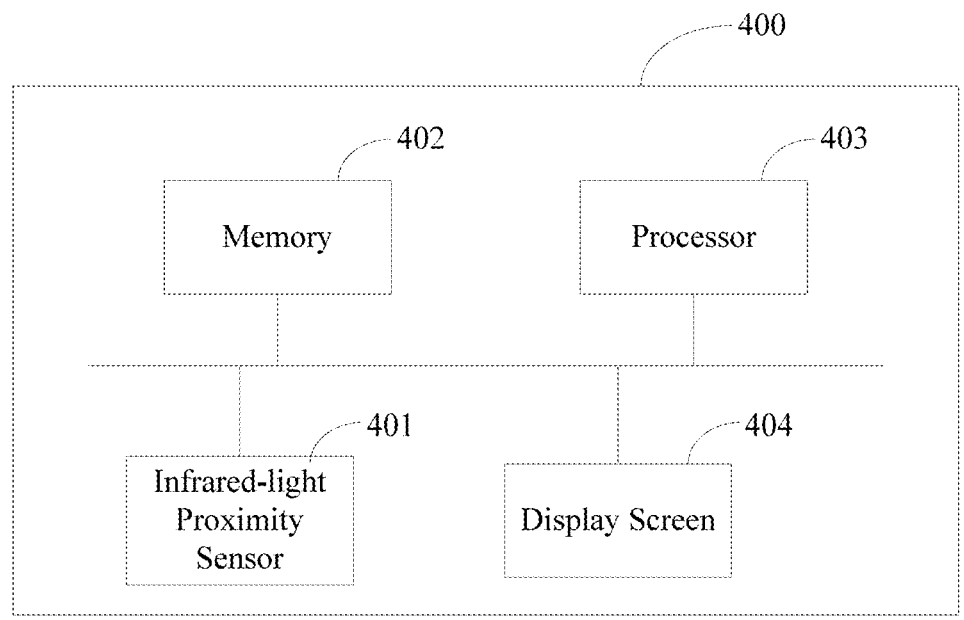
FIG. 16 is a schematic diagram of an electronic device according to an embodiment of the present disclosure.

Referring to FIG. 16, in an embodiment, a schematic diagram of an electronic device is illustrated. The electronic device 400 can include components such as an infrared-light proximity sensor 401, a memory 402, a processor 403, a display screen 404. It will be understood by those skilled in the art that the electronic device 400 illustrated in FIG. 16 isn't used as a limitation sense, and may include more or less components than those illustrated. Alternatively, the electronic device 400 may be a combination of certain components, or an arrangement of different components.

The memory 402 can be used to store computer programs and data. The computer programs stored in the memory 402 contains executable codes. The computer programs may be formed as various functional modules. The processor 403 implements various function applications and data processing by executing the computer programs stored in the memory 402.

The processor 403 is a control center of the electronic device, and is configured to be connected all parts of the electronic device via various interfaces and lines. Various functions and data processing of the electronic device may be implemented by running or executing the computer programs stored in the memory 402 and invoking data stored in the memory 402. Thus, the electronic device may be monitored wholly.

In the electronic device 400, the display screen 404 has a capability of allowing infrared lights to pass through, and the infrared-light proximity sensor 401 is covered by the display screen 404.

In this embodiment, the processor 403 in the electronic device 400 loads the executable codes corresponding to one or more process of the computer programs into the memory 402, and the computer programs stored in the memory 402 are executed by the processor 403 such that the following actions may be implemented: setting an operation timing of the display screen as a target timing when the infrared-light proximity sensor is enabled, wherein the target timing comprises a target duration and the display screen is controlled to emit no lights during the target timing; controlling the infrared-light proximity sensor to emit the infrared lights during the target duration; and performing the proximity detection based on the infrared lights.

Figure 17:
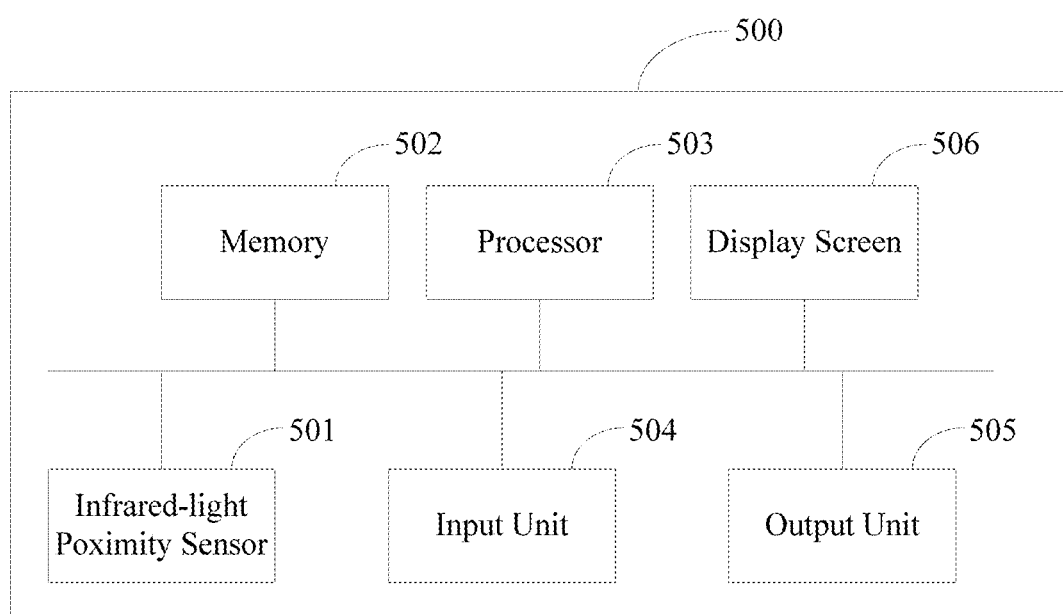
FIG. 17 is a schematic diagram of an electronic device according to another embodiment of the present disclosure.

Referring to FIG. 17, in another embodiment, a schematic diagram of an electronic device is illustrated. The electronic device 500 can include components such as an infrared-light proximity sensor 501, a memory 502, a processor 503, an input unit 504, an output unit 505 and a display screen 506.

The memory 502 can be used to store computer programs and data. The computer programs stored in the memory 502 contains executable codes. The computer programs may be formed as various functional modules. The processor 503 implements various function applications and data processing by executing the computer programs stored in the memory 502.

The processor 503 is a control center of the electronic device, and is configured to be connected all parts of the electronic device via various interfaces and lines. Various functions and data processing of the electronic device may be implemented by running or executing the computer programs stored in the memory 502 and invoking data stored in the memory 502. Thus, the electronic device may be monitored wholly.

The input unit 504 can be configured to receive input digit information, symbol information, or characteristic information of a user (such as fingerprints), and to generate a keyboard, a mouse, a joystick, an optical or trackball signal inputs related to user settings and control functions.

The output unit 505 can be used to display information input by the user or information provided to the user as well as various graphical user interfaces of the electronic device, which can be composed of graphics, text, icons, video, and any combination thereof. The output unit may include a display panel.

In the electronic device 500, the display screen 506 has a capability of allowing infrared lights to pass through, and the infrared-light proximity sensor 501 is covered by the display screen 506.

In this embodiment, the processor 503 in the electronic device 500 loads the executable codes corresponding to one or more process of the computer programs into the memory 502, and the computer programs stored in the memory 502 are executed by the processor 503 such that the following actions may be implemented: setting an operation timing of the display screen as a target timing when the infrared-light proximity sensor is enabled, wherein the target timing comprises a target duration and the display screen is controlled to emit no lights during the target timing; controlling the infrared-light proximity sensor to emit the infrared lights during the target duration; and performing the proximity detection based on the infrared lights.

In one embodiment, the processor 503 may control a potential difference between a positive voltage and a negative voltage of a pixel circuit of the display screen be less than a target threshold such that the display screen is controlled to emit no lights, as it controls the display screen to emit no lights during the target duration. The target threshold is configured to cause the light-emitting component emitting lights.

In one embodiment, the processor 503 controls both the positive voltage and the negative voltage of the pixel circuit be set to zero as it controls the potential difference between the positive voltage and the negative voltage be less than the target threshold.

In one embodiment, the processor 503 may further set the operation timing of the display screen as a basic timing when the infrared-light proximity sensor is disabled. The basic timing includes a first scanning duration configured for the display screen to perform a scan-refresh and a first blank duration configured for a driving chip to process data of a next frame and prepare for displaying.

In one embodiment, the target timing further includes a second scanning duration configured for the display screen to perform the scan-refresh and a second blank duration configured for the driving chip to process data of the next frame and prepare for displaying. In one example, a period of the target timing is equal to a period of the basic timing.

In one embodiment, the processor 503 detects whether the second scanning duration is less than the first scanning duration and controls to increase luminous intensity of the display screen during the second scanning duration when the second scanning duration is less than the first scanning duration, after the setting the operation timing of the display screen as the target timing.

In one embodiment, the processor 503 increases the luminous intensity of the display screen by a Gamma Correction process.

In one embodiment, the processor 503 increases the luminous intensity of the display screen by increasing a potential difference between the positive voltage and the negative voltage of the pixel circuit.

In one embodiment, the target timing further comprises a second scanning duration configured for the display screen to perform the scan-refresh and a second blank duration configured for the driving chip to process data of the next frame and prepare for displaying. In one example, the second scanning duration is controlled to be equal to the first scanning duration.

In one embodiment, the target duration is located between the second scanning duration and the second blank duration during the target timing.

In one embodiment, the infrared-light proximity sensor may include an infrared-light emitting component. An operation timing of the infrared-light emitting component may include an emitting duration configured for the infrared-light emitting component to emit the infrared lights and a non-emitting duration. In one example, a period of the operation timing of infrared-light emitting component is controlled to be equal to a period of the target timing.

In one embodiment, the infrared-light proximity sensor may further include an infrared-light receiving component. An operation timing of the infrared-light receiving component may include a receiving duration configured for the infrared-light receiving component to receive a reflected infrared lights from the infrared lights and a non-receiving duration.

In the foregoing embodiments, the descriptions of the various embodiments are different, and the detailed descriptions for the proximity-detection method may be referred as one embodiment which has been described in detailed, which are not described herein.

It should be noted that, for the method of the proximity detection in the embodiments of the present disclosure, those skilled in the art can understand that all or part of a process of implementing the proximity-detection method in the embodiments of the present disclosure is implemented through controlling related hardware by computer programs. The computer programs can be stored in a computer readable storage medium, such as a memory, and executed by at least one processor. The computer programs can include an implementation of the proximity-detection method as described during the execution. The storage medium may be a magnetic disk, an optical disk, a read only memory (ROM), a random access memory (RAM), or the like.

The proximity-detection method and the electronic device in embodiments of the present disclosure are described in detail. The principles and implementations of the present disclosure are described with examples. The description of the above embodiments is only used to help understand a method and a core idea of the present disclosure. Meanwhile, for those skilled in the art, there will be changes in specific embodiments and disclosure scopes according to the idea of the present disclosure. The descriptions should not be construed to limit the present disclosure.

What is claimed is:

1. A proximity-detection method for an electronic device, wherein the electronic device comprises a display screen having a first surface and a second surface opposite to the first surface and an infrared-light proximity sensor facing the second surface and configured to produce and emit infrared lights toward an object facing the first surface and detect whether the object is in proximity to the electronic device, the infrared lights passes through the display screen toward the object as the display screen has a capability of allowing infrared lights to pass through, and the method comprises:
  setting an operation timing of the display screen as a target timing when the infrared-light proximity sensor is enabled, wherein the target timing comprises a target duration and the display screen is controlled to emit no lights during the target duration;
  controlling the infrared-light proximity sensor to emit the infrared lights during the target duration;
  performing proximity detection based on the infrared lights; and
  setting the operation timing of the display screen as a basic timing when the infrared-light proximity sensor is disabled;
  wherein the basic timing comprises:
    a first scanning duration configured for the display screen to perform a scan-refresh; and
    a first blank duration configured for a driving chip to process data of a next frame and prepare for displaying
  wherein the target timing further comprises:
    a second scanning duration configured for the display screen to perform the scan-refresh; and
    a second blank duration configured for the driving chip to process data of the next frame and prepare for displaying; and
    wherein a period of the target timing is equal to a period of the basic timing
  wherein the target duration is located between the second scanning duration and the second blank duration during the target timing;
  wherein the infrared-light proximity sensor comprises an infrared-light emitting component;
  an operation timing of the infrared-light emitting component comprises:
    an emitting duration configured for the infrared-light emitting component to produce and emit the infrared lights; and
    a non-emitting duration; and
    a period of the operation timing of infrared-light emitting component is equal to a period of the target timing.

2. The method of claim 1, wherein the display screen comprises a pixel circuit, and the pixel circuit comprises a light-emitting component; and
  a potential difference between a positive voltage and a negative voltage of the pixel circuit is controlled to be less than a target threshold such that the display screen is controlled to emit no lights, wherein the target threshold is configured to cause the light-emitting component emitting lights.

3. The method of claim 2, wherein both the positive voltage and the negative voltage of the pixel circuit are set to zero such that the potential difference between the positive voltage and the negative voltage is less than the target threshold.

4. The method of claim 1, after the setting the operation timing of the display screen as the target timing, further comprising:
   detecting whether the second scanning duration is less than the first scanning duration; and
   controlling to increase luminous intensity of the display screen during the second scanning duration when the second scanning duration is less than the first scanning duration.

5. The method of claim 4, wherein the luminous intensity of the display screen is increased by a gamma correction process.

6. The method of claim 4, wherein the display screen comprises a pixel circuit; and
   the luminous intensity of the display screen is increased by increasing a potential difference between a positive voltage and a negative voltage of the pixel circuit.

7. The method of claim 1, wherein the infrared-light proximity sensor further comprises an infrared-light receiving component;
   an operation timing of the infrared-light receiving component comprises:
      a receiving duration configured for the infrared-light receiving component to receive reflected infrared lights by the object from the infrared lights; and
      a non-receiving duration; and
   the emitting duration is totally overlapped by the receiving duration.

8. An electronic device, comprising:
   a display screen having a first surface and a second surface opposite to the first surface and having a capability of allowing infrared lights to pass through;
   an infrared-light proximity sensor facing the second surface and configured to produce and emit the infrared lights toward an object facing the first surface; and
   a processor in communication with a memory and configured to execute computer programs stored in the memory that cause the processor to:
      setting an operation timing of the display screen as a target timing when the infrared-light proximity sensor is enabled, wherein the target timing comprises a target duration and the display screen is controlled to emit no lights during the target duration;
      controlling the infrared-light proximity sensor to emit the infrared lights during the target duration;
      performing proximity detection based on the infrared lights; and
      setting the operation timing of the display screen as a basic timing when the infrared-light proximity sensor is disabled;
   wherein the basic timing comprises:
      a first scanning duration configured for the display screen to perform a scan-refresh; and
      a first blank duration configured for a driving chip to process data of a next frame and prepare for displaying
   wherein the target timing further comprises:
      a second scanning duration configured for the display screen to perform the scan-refresh; and
      a second blank duration configured for the driving chip to process data of the next frame and prepare for displaying; and
      wherein the second scanning duration is equal to the first scanning duration;
   wherein the target duration is located between the second scanning duration and the second blank duration during the target timing;
   wherein the infrared-light proximity sensor comprises an infrared-light emitting component;
   an operation timing of the infrared-light emitting component comprises:
      an emitting duration configured for the infrared-light emitting component to produce and emit the infrared lights; and
      a non-emitting duration; and
      a period of the operation timing of infrared-light emitting component is equal to a period of the target timing.

9. The electronic device of claim 8, wherein the infrared-light proximity sensor further comprises an infrared-light receiving component;
   an operation timing of the infrared-light receiving component comprises:
      a receiving duration configured for the infrared-light receiving component to receive reflected infrared lights from the infrared lights; and
      a non-receiving duration; and
   the emitting duration is totally overlapped by the receiving duration.

10. A non-transitory computer readable medium in an electronic device, storing computer programs, wherein the electronic device comprises a display screen having a first surface and a second surface opposite to the first surface and having a capability of allowing infrared lights to pass through and an infrared-light proximity sensor facing the second surface and configured to emit the infrared lights toward an object facing the first surface, and the computer programs, when executed by a processor, cause the processor to:
   setting an operation timing of the display screen as a target timing when the infrared-light proximity sensor is enabled, wherein the target timing comprises a target duration and the display screen is controlled to emit no lights during the target duration;
   controlling the infrared-light proximity sensor to emit the infrared lights during the target duration;
   performing proximity detection based on the infrared lights; and
   setting the operation timing of the display screen as a basic timing when the infrared-light proximity sensor is disabled;
   wherein the basic timing comprises:
      a first scanning duration configured for the display screen to perform a scan-refresh; and
      a first blank duration configured for a driving chip to process data of a next frame and prepare for displaying
   wherein the target timing further comprises:
      a second scanning duration configured for the display screen to perform the scan-refresh; and
      a second blank duration configured for the driving chip to process data of the next frame and prepare for displaying; and
      wherein a period of the target timing is equal to a period of the basic timing;
   wherein the target duration is located between the second scanning duration and the second blank duration during the target timing;
   wherein the infrared-light proximity sensor comprises an infrared-light emitting component;

an operation timing of the infrared-light emitting component comprises:
   an emitting duration configured for the infrared-light emitting component to produce and emit the infrared lights; and
   a non-emitting duration; and
a period of the operation timing of infrared-light emitting component is equal to a period of the target timing.

* * * * *